United States Patent
Sushihara et al.

(10) Patent No.: US 6,252,440 B1
(45) Date of Patent: Jun. 26, 2001

(54) WRITE-DRIVER CIRCUIT

(75) Inventors: Koji Sushihara; Takashi Yamamoto; Kenichi Ishida, all of Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/445,392

(22) PCT Filed: Sep. 18, 1998

(86) PCT No.: PCT/JP98/04235

§ 371 Date: Mar. 7, 2000

§ 102(e) Date: Mar. 7, 2000

(87) PCT Pub. No.: WO99/16056

PCT Pub. Date: Apr. 1, 1999

(30) Foreign Application Priority Data

Sep. 22, 1997 (JP) .................................................. 9-256519

(51) Int. Cl.[7] ...................................................... H03K 3/00

(52) U.S. Cl. ........................ 327/110; 327/423; 327/424; 327/374; 327/494; 327/587; 327/588; 363/59; 363/98

(58) Field of Search ................................ 327/110, 112, 327/111, 423, 424, 374, 375, 376, 377, 494, 588, 587; 363/58, 98, 132

(56) References Cited

U.S. PATENT DOCUMENTS

| | | | |
|---|---|---|---|
| 4,410,926 | * 10/1983 | Hafner et al. | 361/93 |
| 5,243,472 | * 9/1993 | Molstad | 360/66 |
| 5,781,046 | * 7/1998 | Ngo et al. | 327/110 |
| 6,052,017 | * 4/2000 | Pidutti et al. | 327/110 |
| 6,124,751 | * 9/2000 | Pidutti | 327/424 |

FOREIGN PATENT DOCUMENTS

| | | |
|---|---|---|
| 5298604 | 11/1993 | (JP) . |
| 8124102 | 5/1996 | (JP) . |
| 9219004 | 8/1997 | (JP) . |

* cited by examiner

Primary Examiner—Timothy P. Callahan
Assistant Examiner—An T. Luu
(74) Attorney, Agent, or Firm—Stevens, Davis, Miller & Mosher, LLP

(57) ABSTRACT

In a write driver circuit for switching the direction of a write current passing through a magnetic head or the like having an inductance component, an H-shaped bridge circuit is formed by using four NPN transistors in order to switch the write current at a high speed. Four switching means for controlling the base potentials of the four NPN transistors are provided and two switching means for rapidly decreasing the base potential of one of the two NPN transistors on the power source side, which is turned off when the write current passing through the magnetic head is switched are provided, thereby widening a voltage difference occurring between both terminals of the magnetic head.

14 Claims, 9 Drawing Sheets

(a)

(b)

(c)

WRITE-DRIVER CIRCUIT

TECHNICAL FIELD

The present invention relates to a write driver circuit for recording a digital signal onto a magnetic recording medium by using a magnetic head having an inductance component, which is built in, for example, a magnetic disk apparatus or the like.

BACKGROUND ART

A conventional write driver circuit will be described with reference to FIG. 9. In the write driver circuit, as illustrated in FIG. 9, the collectors of NPN transistors Q21 and Q22 are connected to a power input terminal (Vcc), the collector of an NPN transistor Q23 is connected to the emitter of the NPN transistor Q21, the collector of an NPN transistor Q24 is connected to the emitter of the NPN transistor Q22, the emitters of the NPN transistors Q23 and Q24 are connected to each other, and a current source I1 is connected between the emitters of the NPN transistors Q23 and Q24 and the ground terminal.

A resistor R25 is connected between the collector and base of the NPN transistor Q21, a resistor R26 is connected between the collector and base of the NPN transistor Q22, the collector of an NPN transistor Q25 is connected to the base of the NPN transistor Q21, the collector of an NPN transistor Q26 is connected to the base of the NPN transistor Q22, the emitters of the NPN transistors Q25 and Q26 are connected to each other, and a current source I2 is connected between the emitters of the NPN transistors Q25 and Q26 and the ground terminal.

The bases of the NPN transistors Q23 and Q25 are connected to each other, the bases of the NPN transistors Q23 and Q25 are provided with an input terminal WD of a write signal, the bases of the NPN transistors Q24 and Q26 are connected to each other, and the bases of the NPN transistors Q24 and Q26 are provided with an input terminal WDB of a write signal.

In the write driver circuit, one (X) of terminals of a magnetic head HD is connected to the connection point of the NPN transistors Q21 and Q23 and the other terminal Y of the magnetic head HD is connected to the connection point of the NPN transistors Q22 and Q24.

In the write driver circuit having such a construction, write signals of opposite phases are supplied to the input terminals WD and WDB. For example, when a high-level (H) write signal is supplied to the input terminal WD and a low-level (L) write signal is supplied to the input terminal WDB, the NPN transistors Q21 and Q24 are turned off, the NPN transistors Q22 and Q23 are turned on, and a current is passed to the magnetic head HD in the direction from the terminal Y to the terminal X. When the states of the write signals are opposite, the NPN transistors Q21 and Q24 are turned on, the NPN transistors Q22 and Q23 are turned off, and a current is passed to the magnetic head HD in the direction from the terminal X to the terminal Y.

The conventional write driver circuit has, however, drawbacks as described hereinbelow caused by the fact that the magnetic head HD has an inductance. Specifically, a counter electromotive force occurring across the magnetic head HD when the current passing through the magnetic head HD is reversed is expressed by the following expression (1) where the current passing through the magnetic head HD is i, the counter electromotive force (voltage across the head terminals) occurring across the magnetic head HD is V, the inductance of the magnetic head HD is L, and t denotes time.

$$V=L(di/dt) \quad (1)$$

From the relation of Expression (1), time required for the current passing through the magnetic head HD to be reversed is proportional to each of the inductance L of the magnetic head HD and the current passing through the magnetic head HD and is inversely proportional to the counter electromotive force V. Consequently, the larger the counter electromotive force V is, the shorter the time required for the current passing through the magnetic head HD to be reversed is, because the energy accumulated by the inductance L of the magnetic head HD is discharged in accordance with the product of the level of the counter electromotive force and time.

The operation in a transition period in which, for example, an H-level write signal is supplied to the input terminal WD in a state where an L-level write signal is supplied to the input terminal WD and an L-level write signal is supplied to the input terminal WDB, the state of the write signal is changed to a state in which the H-level write signal is supplied to the input terminal WDB, and the direction of the write current passing through the magnetic head HD is changed from the direction from the terminal X to the terminal Y to the direction from the terminal Y to the terminal X will now be described.

In the write driver circuit, when the state of the write signal is reversed, the H-level write signal is supplied to the input terminal WD, and the L-level write signal is supplied to the input terminal WDB, the NPN transistor Q25 is turned on and a current of the current source I2 is passed to the resistor R25, so that the base potential of the NPN transistor Q21 is decreased from the power source voltage by an amount corresponding to a voltage drop caused by the resistor R25 and the current source I2. Since the NPN transistor Q21 is not completely turned off at this time, that is, remains in the on-state, a voltage Vx at the terminal X of the magnetic head HD is dropped from the base potential of the NPN transistor Q21 only by a base-emitter voltage Vbe of the NPN transistor Q21.

On the other hand, when the NPN transistor Q26 is turned off, the base potential of the NPN transistor Q22 is pulled up to the power source voltage and the NPN transistor Q22 is turned on. A voltage Vy at the terminal Y of the magnetic head HD is consequently dropped from the power source voltage only by the base-emitter voltage Vbe of the NPN transistor Q22.

From the above, when the power voltage is Vcc, the voltage difference between the terminals X and Y of the magnetic head HD is expressed by the following expression (2).

$$|Vy-Vx|=|(Vcc-Vbe)-(Vcc-I2 \cdot R25-Vbe)|=I2 \cdot R25 \quad (2)$$

This similarly applies to the case where the reversing direction of the current passing through the magnetic head HD is opposite and the voltage difference between the terminals X and Y of the magnetic head HD in this case is expressed by the following expression (3).

$$|Vy-Vx|=|(Vcc-I2 \cdot R26-Vbe)-(Vcc-Vbe)|=I2 \cdot R26 \quad (3)$$

As described above, since the voltage difference occurring between the terminals X and Y of the magnetic head HD in a transient period is determined by the resistor R25 or R26 and the current source I2, the counter electromotive force generated by the magnetic head HD is regulated by the voltage difference occurring between the terminals X and Y of the magnetic head HD.

In order to reverse the current passing through the magnetic head HD at high speed, it is necessary to widen the voltage difference between the terminals X and Y of the magnetic head HD so that the counter electromotive force generated by the magnetic head HD is not regulated. For this purpose, it is preferable to widen the voltage difference between both terminals of the magnetic head HD by increasing the current of the current source I2 while not increasing the value of resistance of each of the resistors R25 and R26 for the following reason. When the value of resistance is increased, the area of the resistance region becomes large, so that high packing density cannot be achieved. Moreover, the parasite capacity by the resistance region comes to be unignorable and it causes a slow current reversal.

A state after the reversal of the write current passing through the magnetic head HD from the direction from the terminal X to the terminal Y to the direction from the terminal Y to the terminal X is finished will now be considered. In this case as well, the high-level write signal is continuously supplied to the input terminal WD and the low-level write signal is continuously supplied to the input terminal WDB, the NPN transistors Q21 and Q24 are turned off, the NPN transistors Q22 and Q23 are turned on, and the direction of the write current passing through the magnetic head HD is from the terminal Y to the terminal X.

At this time, the voltage Vy at the terminal Y of the magnetic head HD is dropped from the base potential of the NPN transistor Q22 only by the base-emitter voltage Vbe of the NPN transistor Q22. The voltage Vx at the terminal X of the magnetic head HD is dropped from the voltage Vy at the terminal Y only by an amount of a voltage drop caused by the write current passing through the magnetic head HD and the resistance component of the magnetic head HD.

The voltage drop caused by the write current I1 passing through the magnetic head HD and a resistance component RH of the magnetic head HD is expressed by the following expression (4)

$$|Vy-Vx|=I1 \cdot RH \qquad (4)$$

This similarly applies to a case where the reversing direction of the write current passing through the magnetic head HD is opposite. That is, when the reversal of the write current I1 passing through the magnetic head HD is finished, the voltage difference between both terminals of the magnetic head HD is determined only by the write current I1 passing through the magnetic head HD and the resistance component RH of the magnetic head and the voltage drop by the resistors R25 and R26 does not exert any influence.

From the above, it is necessary to pass a relatively large current to the current source I2 in order to reverse the write current passing through the magnetic head HD at a high speed. When the reversal of the write current passing through the magnetic head HD is finished, however, the relatively large current flowing to the current source I2 becomes useless.

DISCLOSURE OF INVENTION

The invention is to solve the problems and its object is to provide a write driver circuit in which a current consumption can be suppressed and, moreover, a write current passing through a magnetic head can be reversed at a high speed.

A write driver circuit according to claim 1 comprises: a reversal switching circuit having a pair of output terminals connected to both terminals of a magnetic head, for reversing the direction of a write current passing through the magnetic head in response to reversal of a write signal; and high-speed reversing means for reversing the write current at a high speed by making a voltage difference between both terminals of the magnetic head in a period from reversal of the write signal to reversal of the write current to the magnetic head larger than a voltage difference between both terminals of the magnetic head, which occurs only in the reversal switching circuit.

With the construction, since the voltage difference between both terminals of the magnetic head during the write current to the magnetic head is reversed in accordance with the reversal of the write signal is widened, the counter electromotive force of the magnetic head when the write current is reversed can be increased. Consequently, the energy accumulated in the magnetic head can be discharged at a high speed and the write current passing through the magnetic head can be reversed at a high speed. Also, after completion of the reversal of the write current, the operation of the high-speed reversing means is finished and a stationary state is obtained, so that current consumption can be suppressed.

According to the write driver circuit of claim 2, in the write driver circuit described in claim 1, the reversal switching circuit is constructed as follows. That is, the reversal switching circuit comprises: a first power source side transistor and a first ground side transistor which are connected in series in the forward direction between a power input terminal and a ground terminal; a second power source side transistor and a second ground side transistor which are connected in series in the forward direction between the power input terminal and the ground terminal; first switching means which is connected to the base of the first power source side transistor and controls the first power source side transistor in response to a write signal; second switching means which is connected to the base of the second power source side transistor and controls the second power source side transistor in response to the write signal; third switching means which is connected to the base of the first ground side transistor and controls the first ground side transistor in response to the write signal; and fourth switching means which is connected to the base of the second ground side transistor and controls the second ground side transistor in response to the write signal. The magnetic head is connected between a connecting point of the first power source side transistor and the first ground side transistor and a connecting point of the second power source side transistor and the second ground side transistor, and the operation of a set of the first and fourth switching means and that of a set of the second and third switching means are reversed in response to reversal of the write signal to thereby reverse the operation of a set of the first power source side transistor and the second ground side transistor and that of a set of the second power source side transistor and the first ground side transistor, thereby reversing the write current passing through the magnetic head.

With the construction, in a manner similar to claim 1, the write current passing through the magnetic head can be reversed at a high speed and the current consumption can be suppressed.

According to the write driver circuit of claim 3, in the write driver circuit according to claim 2, each of the first and second power source side transistors and the first and second ground side transistors is an NPN transistor, the first switching means is connected between a power input terminal and the base of the first power source side transistor, the second switching means is connected between the power input terminal and the second power source side transistor, the third switching means is connected between the base of the first ground side transistor and the ground terminal, and the fourth switch is connected between the base of the second ground side transistor and the ground terminal.

With this construction, effects similar to those of claim 2 can be produced.

According to the write driver circuit of claim 4, in the write driver circuit according to claim 3, the third switching means has a first NPN switch transistor whose collector is connected to the base of the first ground side transistor and whose emitter is connected to the ground terminal, and the fourth switching means has a second NPN switch transistor whose collector is connected to the base of the second ground side transistor and whose emitter is connected to the ground terminal. Seventh switching means for rapidly decreasing the base potential of the first NPN switch transistor is provided between the base of the first NPN switch transistor and the ground terminal, and eighth switching means for rapidly decreasing the base potential of the second NPN switch transistor is provided between the base of the second NPN switch transistor and the ground terminal.

With the construction, in addition to effects similar to those of claim 3, since the base potentials of the first and second NPN switch transistors as components of the third and fourth switching means are rapidly decreased by the seventh and eighth switching means, a current can be rapidly passed to the first and second ground side transistors. Thus, the write current to the magnetic head can be reversed faster.

According to the write driver circuit of claim 5, in the write driver circuit according to claim 1, the reversal switching circuit and high-speed reversing means are constructed as follows. Specifically, the reversal switching circuit comprises: a first power source side transistor and a first ground side transistor which are connected in series in the forward direction between a power input terminal and a ground terminal; a second power source side transistor and a second ground side transistor which are connected in series in the forward direction between the power input terminal and the ground terminal; first switching means which is connected to the base of the first power source side transistor and controls the first power source side transistor in response to a write signal; second switching means which is connected to the base of the second power source side transistor and controls the second power source side transistor in response to the write signal; third switching means which is connected to the base of the first ground side transistor and controls the first ground side transistor in response to the write signal; and fourth switching means which is connected to the base of the second ground side transistor and controls the second ground side transistor in response to the write signal. The magnetic head is connected between a connecting point of the first power source side transistor and the first ground side transistor and a connecting point of the second power source side transistor and the second ground side transistor, and the operation of a set of the first power source side transistor and the second ground side transistor and that of a set of the second power source side transistor and the first ground side transistor are reversed by reversing the operation of a set of the first and fourth switching means and that of a set of the second and third switching means in response to reversal of the write signal, thereby reversing the write current passing through the magnetic head.

The high speed reversing means comprises fifth and sixth switching means connected to the bases of the first and second power source side transistors, the base potential of one of the first and second power source side transistors, which is turned off by the reversal of the write signal is selectively rapidly decreased to about the ground potential and the potential at the connecting point of one of the power source side transistors, which is turned off by the reversal of the write signal and the ground side transistor which is serially connected to the power source side transistor is decreased, thereby widening the voltage difference between both terminals of the magnetic head.

With the construction, the base potential of one of the first and second power source side transistors, which is turned off by the reversal of the write signal is selectively rapidly decreased to about the ground potential and the potential at the connecting point of one of the power source side transistors, which is turned off by the reversal of the write signal and the ground side transistor which is serially connected to the power source side transistor is decreased, thereby widening the voltage difference between both terminals of the magnetic head. Consequently, in a manner similar to claim 2, the write current passing through the magnetic head can be reversed at a high speed and the current consumption can be suppressed.

According to the write driver circuit of claim 6, in the write driver circuit according to claim 5, each of the first and second power source side transistors and the first and second ground side transistors is an NPN transistor, the first switching means is connected between a power input terminal and the base of the first power source side transistor, the second switching means is connected between the power input terminal and the second power source side transistor, the third switching means is connected between the base of the first ground side transistor and the ground terminal, the fourth switch is connected between the base of the second ground side transistor and the ground terminal, the fifth switching means is connected between the base of the first power source side transistor and the ground terminal, and the sixth switching means is connected between the base of the second power source side transistor and the ground terminal.

With the construction, effects similar to those of claim 5 are produced.

According to the write driver circuit of claim 7, in the write driver circuit according to claim 6, the third switching means has a first NPN switch transistor whose collector is connected to the base of the first ground side transistor and whose emitter is connected to the ground terminal and the fourth switching means has a second NPN switch transistor whose collector is connected to the base of the second ground side transistor and whose emitter is connected to the ground terminal. Seventh switching means for rapidly decreasing the base potential of the first NPN switch transistor is provided between the base of the first NPN switch transistor and the ground terminal; and eighth switching means for rapidly decreasing the base potential of the second NPN switch transistor is provided between the base of the second NPN switch transistor and the ground terminal.

With the construction, effects similar to those of claim 6 are produced. Moreover, since the base potentials of the first and second NPN switch transistors as components of the third and fourth switching means are rapidly decreased by the seventh and eighth switching means, a current can be rapidly passed to the first and second ground side transistors and the write current to the magnetic head can be therefore reversed more rapidly.

According to the write driver circuit of claim 8, in the write driver circuit according to claim 2, 3, 4, 5, 6, or 7, the third and fourth switching means control the first and second ground side transistors within active regions, respectively.

With the construction, since the first and second ground side transistors are controlled within active regions, respectively, the current passed to the first and second ground side transistors can be switched at a high speed. As a result, the direction of the current to the magnetic head can be switched more rapidly.

According to the write driver circuit of claim 9, in the write driver circuit according to claim 2, 3, 4, 5, 6, or 7, each of the first and second ground side transistors is an output side transistor of a current mirror circuit.

With the construction, effects similar to those of claim 2, 3, 4, 5, 6, or 7 are produced. In addition, since the first and second ground side transistors also serve as constant current circuits, it is unnecessary to provide constant current transistors in series with the first and second ground side transistors. Consequently, the circuit construction can be simplified.

According to the write driver circuit of claim 10, in the write driver circuit according to claim 5 or 6, first and second differentiating circuits for differentiating a write signal are provided at input terminals of the fifth and sixth switching means.

With the construction, effects similar to those of the write driver circuit according to claim 5 or 6 are produced. In addition, since the first and second differentiating circuits are provided at the input terminals of the fifth and sixth switching means, the fifth and sixth switching means can be completely turned off when the switching of the direction of the write current is finished, and the current flowing to the fifth and sixth switching means, that is, the current for decreasing the base potentials of transistors does not flow, so that the current consumption can be further suppressed.

According to the write driver circuit of claim 11, in the write driver circuit according to claim 4 or 7, third and fourth differentiating circuits for differentiating a write signal are provided at input terminals of the seventh and eighth switching means.

With the construction, effects similar to those of claim 4 or 7 are produced. In addition, by providing the third and fourth differentiating circuits at the input terminals of the seventh and eighth switching means, the seventh and eighth switching means can be completely turned off upon completion of the switching of the direction of the write current. Consequently, the current flowing to the seventh and eight switching means, that is, the current to decrease the base potentials of the transistors does not flow, so that the current consumption can be further suppressed.

According to the write driver circuit of claim 12, in the write driver circuit according to claim 2 or 5, first and second clamp circuits for preventing the first and second ground side transistors from being saturated are provided at the connecting point of the first power source side transistor and the first ground side transistor and the connecting point of the second power source side transistor and the second ground side transistor, respectively.

With the construction, effects similar to those of claim 2 or 5 are produced. Moreover, since the voltage across the magnetic head is clamped by using the first and second clamp circuits, the first and second ground side transistors can be prevented from being saturated.

According to the write driver circuit of claim 13, in the write driver circuit according to claim 2 or 5, first and second protective resistors for regulating a current passing to the first and second power source side transistors are provided between the first and second power source side transistors and the power input terminal, respectively.

With the construction, effects similar to those of claim 2 or 5 are produced. Since the current passed to the first and second power source side transistors is regulated by using the first and second protective resistors, breakage or deterioration caused by increase in the current to the first and second power source side transistors when the magnetic head comes into contact with a magnetic recording medium can be prevented.

According to the write driver circuit of claim 14, in the write driver circuit according to claim 3 or 6, a booster circuit for widening a voltage difference between both terminals of the magnetic head is provided between at least one of the first and second switching means and the power input terminal.

With the construction, effects similar to those of claim 3 or 6 are produced. Moreover, the voltage difference between both terminals of the magnetic head can be widened by the booster circuit, so that the direction of the write current passing through the magnetic head can be switched at a higher speed.

According to the write driver circuit of claim 15, in the write driver circuit according to claim 3 or 6, a booster circuit for widening a voltage difference between both terminals of the magnetic head is provided between either the first switching means and the first power source transistor or the second switching means and the second power source side transistor and the power input terminal.

With the construction, effects similar to those of claim 3 or 6 are produced. Moreover, the voltage difference between both terminals of the magnetic head can be widened by the booster circuit more than the case of claim 14 and the direction of the write current passing through the magnetic head can be switched at a higher speed.

BEST MODE FOR CARRYING OUT THE INVENTION (First Embodiment)

The first embodiment of the invention will be described with reference to FIGS. 1, 2, 3, and 4.

Figure 1:
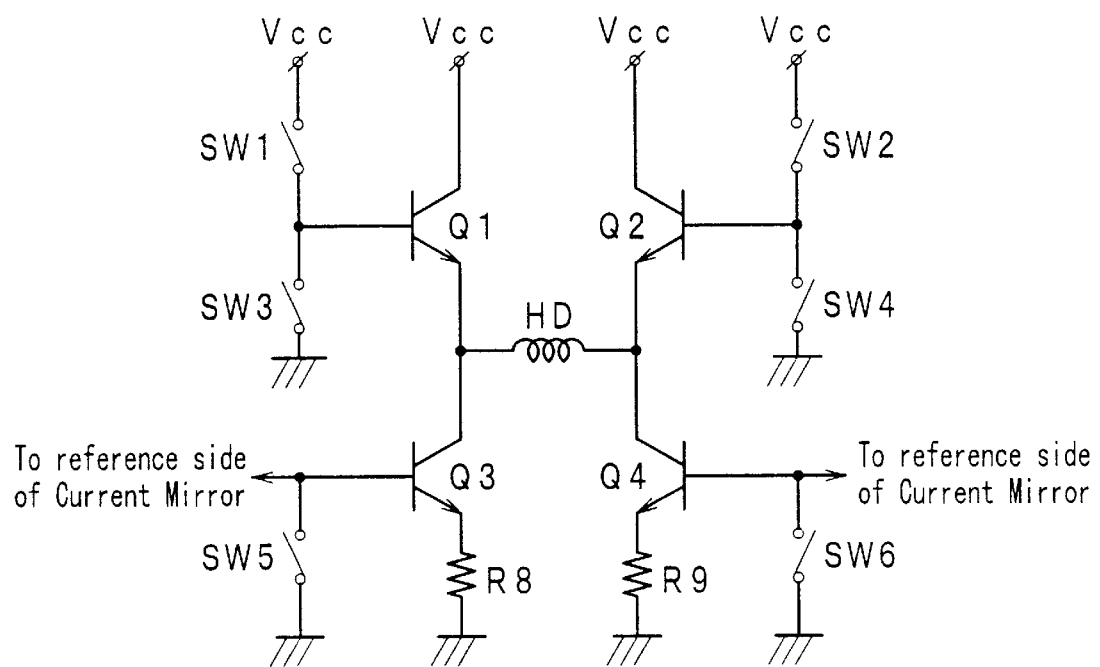
FIG. 1 is a circuit diagram showing a fundamental construction of a write driver circuit of a first embodiment of the invention.

FIG. 1 is a circuit diagram showing a fundamental construction of a write driver circuit of the first embodiment of the invention. As shown in FIG. 1, in the write driver circuit, the collectors of NPN transistors Q1 and Q2 are connected to a power input terminal (Vcc), the collector of an NPN transistor Q3 is connected to the emitter of the NPN transistor Q1, the collector of an NPN transistor Q4 is connected to the emitter of the NPN transistor Q2, the emitter of the NPN transistor Q3 is connected to the ground terminal via a resistor R8, and the emitter of the NPN transistor Q4 is connected to the ground terminal via a resistor R9. That is, in the circuit, the four NPN transistors Q1 to Q4 construct an H-shaped bridge circuit. The NPN transistors Q1 and Q2 correspond to first and second power source side transistors and the NPN transistors Q3 and Q4 correspond to first and second ground side transistors.

In the circuit, each of the NPN transistors Q3 and Q4 functions as an output side circuit of a current mirror circuit, that is, a current source circuit. Each of the bases is connected to the base of the transistor in a corresponding reference side circuit. The reference side circuit is omitted in the diagram.

Switching means SW1 is connected between the power input terminal (Vcc) and the base of the NPN transistor Q1, switching means SW2 is connected between the power input terminal (Vcc) and the base of the NPN transistor Q2, switching means SW3 is connected between the base of the NPN transistor Q1 and the ground terminal, switching means SW4 is connected between the base of the NPN transistor Q2 and the ground terminal, switching means SW5 is connected between the base of the NPN transistor Q3 and the ground terminal, and switching means SW6 is connected between the base of the NPN transistor Q4 and the ground terminal. The switching means SW1 and SW2 correspond to the first and second switching means, the switching means SW3 and SW4 correspond to the fifth and sixth switching means, and the switching means SW5 and SW6 correspond to the third and fourth switching means.

The on/off state of each of the switching means SW1, SW2, SW3, SW4, SW5, and SW6 is controlled in accordance with the write signal.

In the write driver circuit, one (X) of the terminals of the magnetic head HD is connected to the connection point of the NPN transistors Q1 and Q3 and the other terminal Y of the magnetic head HD is connected to the connection point of the NPN transistors Q2 and Q4.

Figure 2:
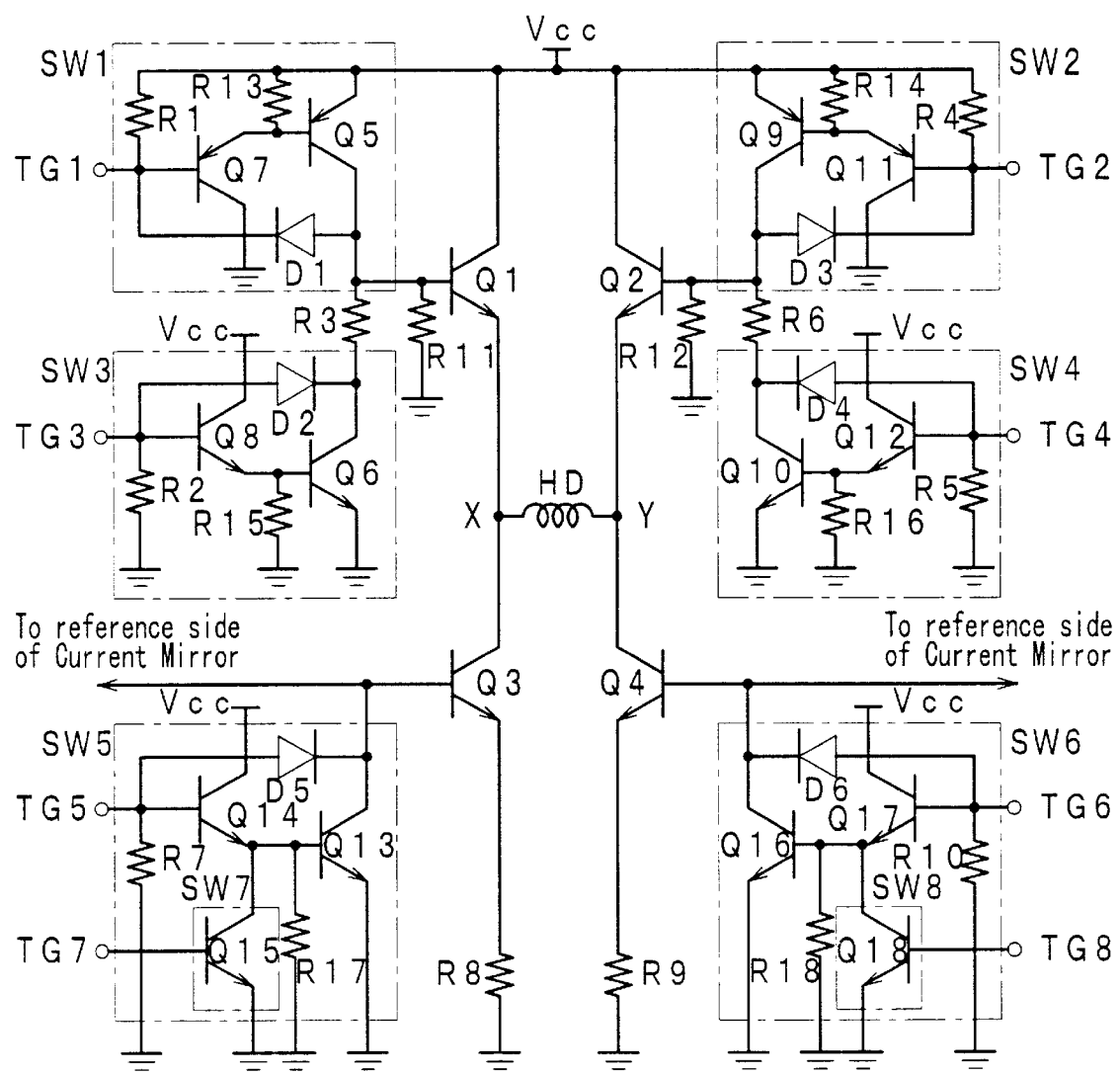
FIG. 2 is a circuit diagram showing a specific construction of the write driver circuit of the first embodiment of the invention.

FIG. 2 is a circuit diagram showing a specific construction of the write driver circuit of the first embodiment of the invention. The write driver circuit is constructed as shown in FIG. 2. The connecting relations of the NPN transistors Q1, Q2, Q3, and Q4, the resistors R8 and R9, and the magnetic head HD are as described above with reference to FIG. 1.

In the switching means SW1, the emitter of a PNP transistor Q5 is connected to the power input terminal (Vcc), the collector of the PNP transistor Q5 is connected to the base of the NPN transistor Q1, the emitter of a PNP transistor Q7 is connected to the base of the PNP transistor Q5, and the collector of the PNP transistor Q7 is connected to the ground terminal. A pull-up resistor R13 is connected between the emitter and base of the PNP transistor Q5, a pull-up resistor R1 is connected between the emitter of the PNP transistor Q5 and the base of the PNP transistor Q7, a diode D1 is connected between the collector of the PNP transistor Q5 and the base of the PNP transistor Q7, and a pull-down resistor R11 is connected between the base of the NPN transistor Q1 and the ground terminal. The base of the PNP transistor Q7 is provided with an input terminal TG1.

The switching means SW2 has a construction similar to that of the switching means SW1 and comprises PNP transistors Q9 and Q11, pull-up resistors R4 and R14, pull-down resistor R12, and a diode D3. The base of the PNP transistor Q11 is provided with an input terminal TG2.

The switching means SW3 is connected to the base of the NPN transistor Q1 via a resistor R3, the collector of an NPN transistor Q6 is connected to the base of the NPN transistor Q1 via the resistor R3, and the emitter of the NPN transistor Q6 is connected to the ground terminal. The emitter of an NPN transistor Q8 is connected to the base of the NPN transistor Q6 and the collector of the NPN transistor Q8 is connected to the power input terminal (Vcc). A pull-down resistor R15 is connected between the base of the NPN transistor Q6 and the ground terminal (that is, the emitter of the NPN transistor Q6), a pull-down resistor R2 is connected between the base of the NPN transistor Q8 and the ground terminal, and a diode D2 is connected between the base of the NPN transistor Q8 and the collector of the NPN transistor Q6. The base of the NPN transistor Q8 is provided with an input terminal TG3.

The switching means SW4 has a construction similar to that of the switching means SW3 and comprises NPN transistors Q10 and Q12, pull-down resistors R5 and R16, and a diode D4. The base of the NPN transistor Q12 is provided with an input terminal TG4.

In the switching means SW5, the collector of an NPN transistor Q13 is connected to the base of the NPN transistor Q3, the emitter of the NPN transistor Q13 is connected to the ground terminal, the emitter of an NPN transistor Q14 is connected to the base of the NPN transistor Q13, and the collector of the NPN transistor Q14 is connected to the power input terminal (Vcc). A pull-down resistor R17 is connected between the base of the NPN transistor Q13 and the ground terminal (that is, the emitter of the NPN transistor Q13), a pull-down resistor R7 is connected between the base of the NPN transistor Q14 and the ground terminal, and a diode D5 is connected between the base of the NPN transistor Q14 and the collector of the NPN transistor Q13. The base of the NPN transistor Q14 is provided with an input terminal TG5.

The switching means SW6 has a construction similar to that of the switching means SW5 and comprises NPN transistors Q16 and Q17, pull-down resistors R10 and R18, and a diode D6. The base of the NPN transistor Q17 is provided with an input terminal TG6.

In the circuit of FIG. 2, besides the switching means SW1 to SW6, switching means SW7 for controlling the switching means SW5 and switching means SW8 for controlling the switching means SW6 are provided. In the switching means SW7, the collector of an NPN transistor Q15 is connected to the base of the NPN transistor Q13, the emitter of the NPN transistor Q15 is connected to the ground terminal, and the base of the NPN transistor Q15 is provided with an input terminal TG7. In the switching means SW8, the collector of an NPN transistor Q18 is connected to the base of the NPN transistor Q16, the emitter of the NPN transistor Q18 is connected to the ground terminal, and the base of the NPN transistor Q18 is provided with an input terminal TG8. The switching means SW7 and SW8 correspond to seventh and eighth switching means.

In the write driver circuit of the first embodiment, the switching means SW1 is constructed by a Darlington circuit comprising the PNP transistors Q5 and Q7, the resistors R1, R11, and R13, and the diode D1. The input terminal TG1 is connected to the base of the PNP transistor Q7, that is, the base of the Darlington circuit. The switching means SW3 is constructed by a Darlington circuit comprising the NPN transistors Q6 and Q8, the resistors R2 and R15, and the diode D2. The input terminal TG3 is connected to the base of the NPN transistor Q8, that is, the base of the Darlington circuit. The base potential of the NPN transistor Q1 is controlled by the switching means SW1 and SW3.

In a manner similar to the above construction, the switching means SW2 is constructed by a Darlington circuit comprising the PNP transistors Q9 and Q11, the resistors R4, R12, and R14, and the diode D3. The input terminal TG2 is connected to the base of the PNP transistor Q11, that is, the base of the Darlington circuit. The switching means SW4 is constructed by a Darlington circuit comprising the NPN transistors Q10 and Q12, the resistors R5 and R16, and the diode D4. The input terminal TG4 is connected to the base of the NPN transistor Q12, that is, the base of the Darlington circuit. The base potential of the NPN transistor Q2 is controlled by the switching means SW2 and SW4.

Further, the switching means SW5 is constructed by a Darlington circuit comprising the NPN transistors Q13 and Q14, the resistors R7 and R17, and the diode D5. The input terminal TG5 is connected to the base of the NPN transistor Q14, that is, the base of the Darlington circuit to control the base potential of the transistor Q3.

The switching means SW6 is similarly constructed by a Darlington circuit comprising the NPN transistors Q16 and Q17, the resistors R10 and R18, and the diode D6. The input terminal TG6 is connected to the base of the NPN transistor Q17, that is, the base of the Darlington circuit to control the base potential of the NPN transistor Q4.

The switching means SW7 is constructed by the NPN transistor Q15, and the input terminal TG7 and the base of the NPN transistor Q15 are connected to control the base potential of the NPN transistor Q13, thereby controlling the switching means SW5. The switching means SW8 has a similar construction and is constructed by the NPN transistor Q18 and the input terminal TG8 and the base of the NPN transistor Q18 are connected to control the base potential of the NPN transistor Q16, thereby controlling the switching means SW6.

In the above, the NPN transistors Q1 to Q4 and the switching means SW1, SW2, SW5, and SW6 construct a reversal switching circuit and the switching means SW3 and SW4 construct high-speed reversing means for widening the potential difference between both terminals of the magnetic head HD until the write current is reversed. The switching means SW7 and SW8 have the function of quickening the start-up upon energization of the switching means SW5 and SW6.

Figure 3:
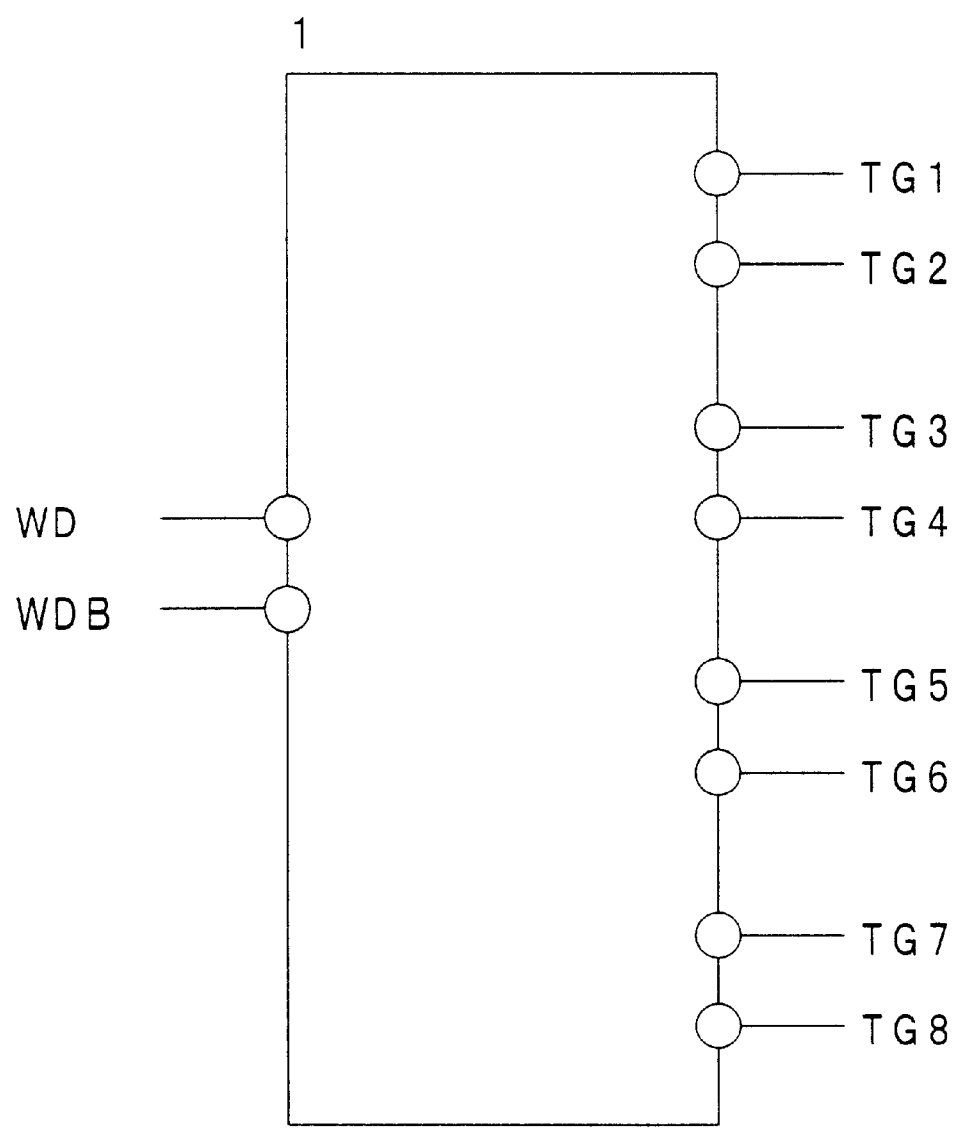
FIG. 3 is a block diagram showing a selector circuit of the first embodiment.

The switching means SW1, SW2, SW3, SW4, SW5, SW6, SW7, and SW8 are controlled by supplying control signals outputted from a selector circuit 1 shown in FIG. 3 to the input terminals TG1, TG2, TG3, TG4, TG5, TG6, TG7, and TG8 to turn on or off the NPN transistors Q1, Q2, Q3 and Q4, thereby switching the direction of the write current passing to the magnetic head HD.

In FIG. 3, WD and WDB are input terminals of the write signal, TG1, TG2, TG3, TG4, TG5, TG6, TG7, and TG8 are output terminals of control signals, and 1 denotes the selector circuit. When write signals of logics which are opposite to each other are supplied to the input terminals WD and WDB, the selector circuit 1 outputs the control signals of the switching means SW1, SW2, SW3, SW4, SW5, SW6, SW7, and SW8 satisfying the logic of a table of truth values of Table 1 to the output terminals TG1, TG2, TG3, TG4, TG5, TG6, TG7, and TG8.

TABLE 1

|  | TG1 | TG2 | TG3 | TG4 | TG5 | TG6 | TG7 | TG8 |
|---|---|---|---|---|---|---|---|---|
| WD H WDB L | L | H | L | H | H | L | L | H |
| WD L WDB H | H | L | H | L | L | H | H | L |

The output terminals TG1, TG2, TG3, TG4, TG5, TG6, TG7, and TG8 of the selector circuit 1 of FIG. 3 are the same as the input terminals TG1, TG2, TG3, TG4, TG5, TG6, TG7, and TG8 of the write driver circuit in FIG. 2, and the same reference numerals are used.

The operation of the write driver circuit constructed as mentioned above will now be mentioned as below. When a high-level write signal is supplied to the input terminal WD and a low-level write signal is supplied to the input terminal WDB, as shown in Table 1, high-level control signals of the switching means SW2, SW4, SW5, and SW8 are supplied to the TG2, TG4, TG5, and TG8 and low-level control signals of the switching means SW1, SW3, SW6, and SW7 are supplied to the TG1, TG3, TG6, and TG7. By turning on the switching means SW2, SW4, SW5, and SW8 and turning off the switching means SW1, SW3, SW6, and SW7, the NPN transistors Q1 and Q4 are turned on, the NPN transistors Q2 and Q3 are turned off, and the write current is passed through the magnetic head HD in the direction from the terminal X to the terminal Y. The operation is similarly performed also in the opposite case and the write current is passed through the magnetic head HD in the direction from the terminal Y to the terminal X.

The operation in a period from the state of the upper section of Table 1 to the state of the lower section, during which the write signal supplied to the input terminal WD is changed from the high level to the low level, the write signal supplied to the input terminal WDB is changed from the low level to the high level, that is, the control signals applied to the input terminals TG1, TG3, TG6, and TG7 are changed from L (low level) to H (high level), the control signals applied to the input terminals TG2, TG4, TG5, and TG8 are changed from H to L as shown in Table 1, and the direction from the terminal X to the terminal Y of the write current passing through the magnetic head HD is reversed to the direction from the terminal Y to the terminal X will now be described. In the following description of the operation, with respect to the control signals supplied to the input terminals TG1, TG2, TG3, TG4, TG5, TG6, TG7, and TG8, only the state after the change is described.

When the control signal L is supplied to the input terminal TG2, the switching means SW2 is turned on. When the control signal L is supplied to the input terminal TG4, the switching means SW4 is turned off. Consequently, a base potential Vb2 of the NPN transistor Q2 starts to change (rise) to a voltage which is dropped from the power source voltage Vcc only by the voltage Vbe by the PNP transistors Q9 and Q11 and the diode D3 constructing the switching means SW2, and the NPN transistor Q2 is turned on.

The voltage Vbe denotes either a base-emitter voltage of the transistor constructing any of the switching means SW1 to SW8 or a forward voltage of a diode and its value is about 0.7V. The base potential Vb2 of the NPN transistor Q2 becomes a voltage dropped from the power source voltage Vcc only by the voltage Vbe for the following reason. When the switching means SW2 is turned on, the potential at the input terminal TG2 is fixed to the voltage dropped from the power source voltage Vcc only by a voltage 2Vbe, and the base potential Vb2 of the NPN transistor Q2 becomes a voltage higher than the potential at the input terminal TG2 only by a forward voltage of the diode D3. Since the switching means SW4 is off at this time, it does not contribute to the base potential Vb2 of the NPN transistor Q2.

On the other hand, since control signals H are supplied to the input terminals TG1 and TG3, the switching means SW1 is turned off and the switching means SW3 is turned on. Consequently, a base potential Vb1 of the NPN transistor Q1 starts to change (drop) to the voltage Vbe by the NPN transistors Q6 and Q8 and the diode D2 constructing the switching means SW3 and the NPN transistor Q1 is turned off. In this case, when the switching means SW1 is turned off, the switching means SW3 is turned on, thereby enabling the base potential Vb1 of the NPN transistor Q1 to be rapidly dropped as compared with the case where the base potential Vb1 of the NPN transistor Q1 is dropped only by the pull-down resistor R11. As described above, the base potential Vb1 of the NPN transistor Q1 becomes the voltage Vbe for the following reason. When the switching means SW3 is turned on, the potential at the input terminal TG3 is fixed to the voltage 2Vbe when the ground potential is a reference, and the base potential Vb1 of the NPN transistor Q1 becomes a voltage lower than the potential of the input terminal TG3 only by the forward voltage of the diode D2. Since the switching means SW1 is off at this time, it does not contribute to the base potential Vb1 of the NPN transistor Q1.

Since the control signals L and H are supplied to the input terminals TG5 and TG7, respectively, the switching means SW5 is turned off and the switching means SW7 is turned on. A predetermined write current I according to the current mirror reference side circuit flows, a base potential Vb3 of the NPN transistor Q3 becomes a voltage obtained by adding the amount corresponding to the voltage drop by the resistor RB and the write current I and a base-emitter voltage Vbe3 of the NPN transistor Q3, and the NPN transistor Q3 is turned on. Since the switching means SW5 is off at this time, it does not contribute to the base potential Vb3 of the NPN transistor Q3. When the switching means SW7 is turned on, the base potential of the NPN transistor Q13 in the switching means SW5 rapidly drops and the switching means SW5 is turned off quickly.

On the other hand, since the control signals H and L are supplied to the input terminals TG6 and TG8, respectively, the switching means SW6 is turned on and the switching means SWB is turned off. A base potential Vb4 of the NPN transistor Q4 starts to change (drop) to the voltage Vbe by the NPN transistors Q16 and Q17 and the diode D6 constructing the switching means SW6 and the NPN transistor Q4 is turned off. The base voltage Vb4 of the NPN transistor Q4 becomes the voltage Vbe as described above for the following reason. When the switching means SW6 is turned on, the potential of the input terminal TG6 is fixed to the voltage 2Vbe by using the ground potential as a reference and the base potential Vb4 of the NPN transistor Q4 becomes a voltage lower than the potential of the input terminal TG6 only by the amount of the forward voltage of the diode D6.

From the above, the voltage Vy at the terminal Y of the magnetic head HD becomes a voltage dropped from the base potential Vb2 of the NPN transistor Q2 only by the base-emitter voltage Vbe2 of the NPN transistor Q2. When the power source voltage is Vcc, the voltage Vy at the terminal Y can be expressed by the following expression (5).

$$Vy = Vb2 - Vbe2 = Vcc - (Vbe + Vbe2) \tag{5}$$

The voltage Vx at the other terminal X of the magnetic head HD in a stationary state after the direction of the write current is reversed becomes a voltage dropped from the voltage Vy at the terminal Y of the magnetic head HD only by an amount of the voltage drop caused by the resistance component RH of the magnetic head HD and the write current I and can be expressed by the following expression (6).

$$Vx = Vy - I \cdot RH = Vcc - (Vbe + Vbe2) - I \cdot RH \tag{6}$$

In a transient state until the direction of the write current is reversed, the NPN transistor Q2 starts to be turned on and the NPN transistor Q1 starts to be turned off and the state is also considered as a state where both of the NPN transistors Q1 and Q2 are ON. In this case, the voltage across the magnetic head HD is as follows. The voltage Vy at the terminal Y is expressed by the following expression (7) in a manner similar to the stationary state.

$$Vy = Vcc - (Vbe + Vbe2) \tag{7}$$

The voltage Vx at the terminal X becomes the voltage dropped from the base potential Vb1 of the NPN transistor Q1 only by the base-emitter voltage Vbe1 of the NPN transistor Q1 and is expressed by the following expression (8).

$$Vx = Vb1 - Vbe1 \tag{8}$$

At this time, the switching means SW1 is turned off and the switching means SW3 is turned on, thereby passing a large current to the collector of the NPN transistor Q6. Consequently, the base potential Vb1 of the NPN transistor Q1 is changing (dropping) rapidly to the voltage Vbe by using the ground potential as a reference. The voltage Vx at the terminal X becomes a low voltage, so that the voltage difference occurring between both terminals of the magnetic head HD can be widened and the direction of the write current passing through the magnetic head HD at a high speed can be rapidly reversed. When the reversal of the direction of the write current is finished, the base potential Vb1 of the NPN transistor Q1 becomes a voltage increased from the ground potential by the voltage Vbe by the turn-on of the switching means SW3. The NPN transistor Q6, that is, the switching means SW3 is turned off and the current passing to the collector of the NPN transistor Q6, that is, the current passing to the switching means SW3 becomes smaller, so that the current consumption becomes lower as compared with that of a conventional technique.

As mentioned above, since the decreasing speed of the base potential of each of the NPN transistors Q1 and Q2 is slow when only the pull-down resistors R11 and R12 are used, the switching means SW3 and SW4 are provided to solve the problem. That is, although the base potentials of the NPN transistors Q1 and Q2 are reduced by the switching means SW1 and SW2 without the switching means SW3 and SW4, the switching means SW3 and SW4 are provided in order to decrease the base potential at a high speed.

In the case where the write current changes in the direction opposite to the above direction, the operation is similar to the above.

The point of controlling the switching means SW5 and SW6 by the switching means SW7 and SW8 will now be described in detail. For example, by supplying the control signal H to the input terminal TG5, the switching means SW5 is turned on, the base potential Vb3 of the NPN transistor Q3 becomes a voltage increased from the ground potential by an amount of Vbe, and the NPN transistor Q3 is turned off. On the contrary, by supplying the control signal L to the input terminal TG5, the switching means SW5 is turned off, the base potential Vb3 of the NPN transistor Q3 rises to a voltage obtained by adding the amount of the voltage drop caused by the resistor R8 and the write current and the base-emitter voltage Vbe3 of the NPN transistor Q3, and the NPN transistor Q3 is turned on.

When the control signal L is supplied to the input terminal TG5, the pull-down resistors R7 and R17 pull down the base potential of the NPN transistor Q14 and the base potential of the NPN transistor Q13 to the ground potential so that the NPN transistors Q14 and Q13 are turned off, thereby turning off the switching means SW5. In the case where only the pull-down resistors R7 and R17 are used, however, a relatively long time is necessary as time required to pull down the base potential of the NPN transistor Q13 to the ground potential. In order to decrease the base potential of the NPN transistor Q13 to the ground potential rapidly, the switching means SW7, that is, the NPN transistor Q15 is provided between the base of the NPN transistor Q13 and the ground terminal, thereby enabling the switching means SW5 to be rapidly turned off, that is, enabling the NPN transistor Q3 to be rapidly turned on. As a result, the write current can be reversed at a high speed. The operations of the switching means SW6 and SW7 are similar to the above.

Description will be given with respect to the point that the NPN transistors Q3 and Q4 are controlled in an active region by the switching means SW5 to SW8. The base potentials of the NPN transistors Q3 and Q4 are controlled by voltages of the levels shown below.

High level Vbe3+I·R8 or Vbe4+I·R9

Low level Vbe (voltage across the ground terminals of the switching means SW5 and SW6)

The high-level and low-level voltages are set so that both of the NPN transistors Q3 and Q4 can be used in the active region. At the time of high level, a current of about tens mA is passed to the collectors of the NPN transistors Q3 and Q4. At the time of low level, a current of few mA or less is passed. A slight current (few mA or less) is passed also at the OFF time for the reason described hereinbelow. To be specific, with such a construction, as compared with a case where the low level is the ground potential and the NPN transistors Q3 and Q4 are changed to an interrupting region and are completely turned off so as not to pass a current to the collectors, the ON/OFF state of the NPN transistors Q3 and Q4, that is, whether the write current is led to the collectors or not can be switched at a higher speed, and the write current can be reversed at a higher speed also from this point.

Figure 9:
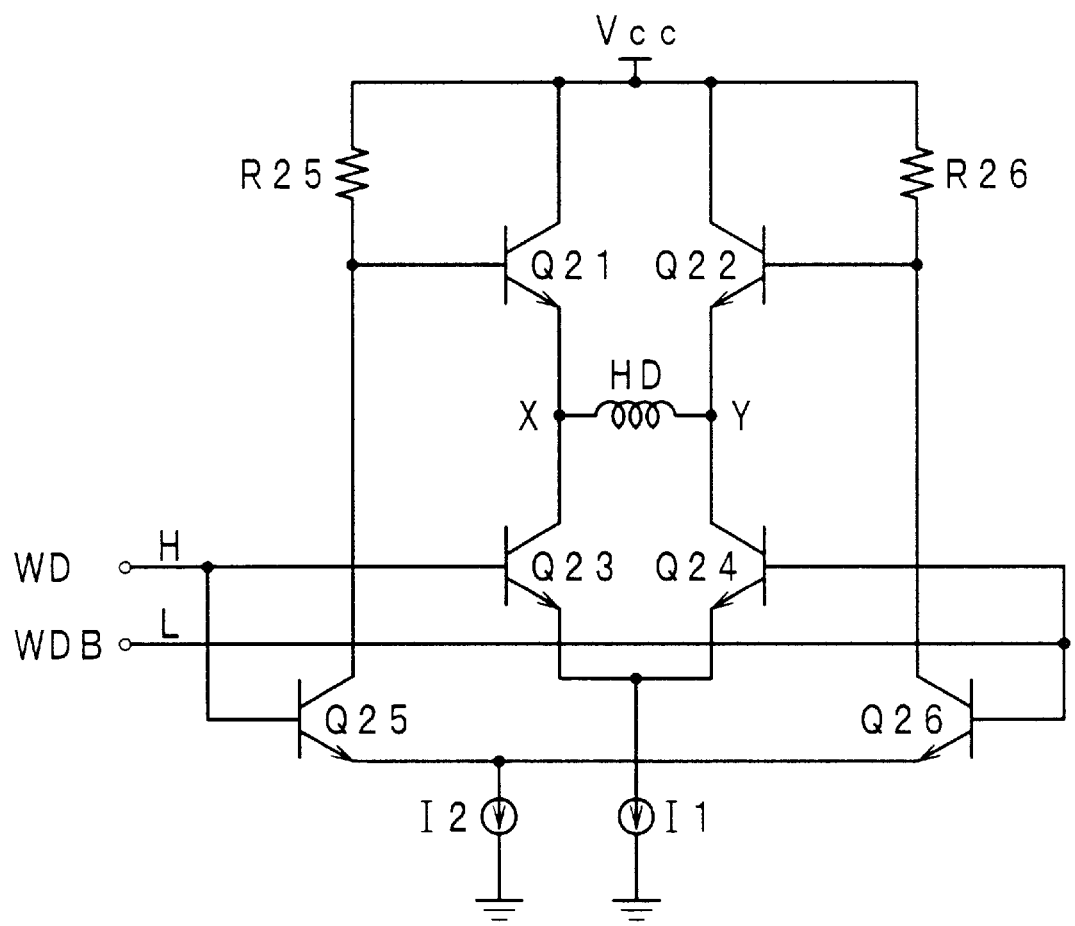
FIG. 9 is a circuit diagram showing a conventional write driver circuit.

As mentioned above, the switching means SW5 and SW6 are provided in order to control the NPN transistors Q3 and Q4 in the active region and to turn on/off the current passing to the NPN transistors Q3 and Q4 at a high speed and are not used to directly widen the voltage difference between both terminals of the magnetic head HD. Since the NPN transistors Q3 and Q4 serve as output transistors of the current mirror, however, the base potential of the NPN transistor Q3 becomes a voltage obtained by adding the base-emitter voltage Vbe3 and the amount corresponding to the voltage drop caused by the resistor R8 and the write current and the base potential of the NPN transistor Q4 becomes a voltage obtained by adding the base-emitter voltage Vbe4 and the amount corresponding to the voltage drop caused by the resistor R9 and the write current. Consequently, the base potential can be set to be lower than that of each of the NPN transistors Q23 and Q24 in the conventional circuit (refer to FIG. 9). This widens the voltage difference between the terminals of the magnetic head HD. That is, since the base potential of each of the NPN transistors Q3 and Q4 in the circuit of FIG. 1 can be set to be lower than the base potential of each of the NPN transistors Q23 and Q24 in FIG. 9 only by an amount of the current source I1 in FIG. 9, the voltage difference between the terminals of the magnetic head HD can be widened.

Figure 4:
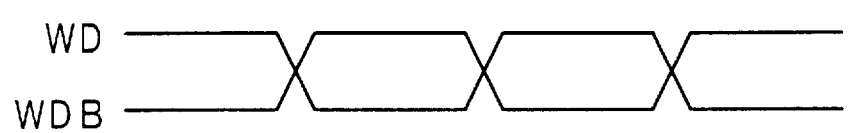
FIG. 4 is a time chart illustrating write signal waveforms (a), head terminal potential waveforms (b) of the first embodiment, and head terminal potential waveforms (c) of a conventional technique.
Figure 4:
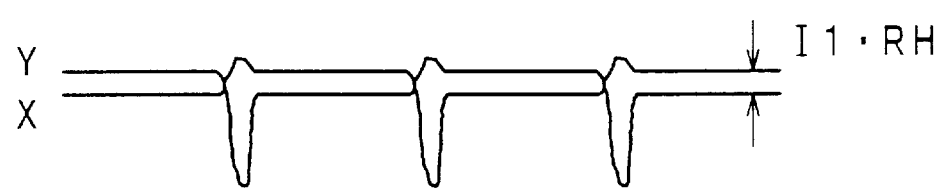
Figure 4:
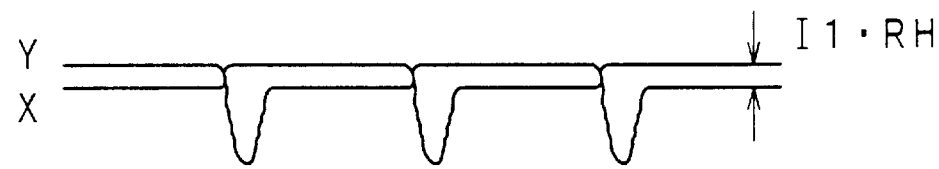

FIG. 4 is a time chart of the circuit of FIG. 2, in which (a) shows the waveforms of the write signals (WD, WDB), (b) shows the waveforms of the head terminal potentials Vx and Vy at both terminals X and Y of the magnetic head HD in the first embodiment, and (c) illustrates the waveforms of the head terminal potentials Vx and Vy at both terminals X and Y of the conventional magnetic head HD. When the waveforms of (b) are compared with those of (c) in FIG. 4, it is obvious that the difference between the head terminal potentials Vx and Vy at both terminals X and Y of the magnetic head HD during the write current is reversed of the first embodiment is larger than that of the conventional technique.

The first embodiment has the construction that the voltage difference between both terminals of the magnetic head HD is large during the write current passing through the magnetic head HD is reversed. In this case, the switching means SW1 to SW6 are connected to the bases of the NPN transistors Q1 to Q4 and the switching means SW7 and SW8 for controlling the switching means SW5 and SW6 are connected to the switching means SW5 and SW6, respectively. Specifically, as switching means for controlling the base voltage of the NPN transistor Q1, the switching means SW1 is connected between the power input terminal and the base of the NPN transistor Q1 and the switching means SW3 is connected between the base of the NPN transistor Q1 and the ground terminal. As switching means for controlling the base voltage of the NPN transistor Q2, the switching means SW2 is connected between the power input terminal and the base of the NPN transistor Q2 and the switching means SW4 is connected between the base of the NPN transistor Q2 and the ground terminal. As switching means for controlling the base voltage of the NPN transistor Q3, the switching means SW5 is connected between the base of the NPN transistor Q3 and the ground terminal. As switching means for controlling the base voltage of the NPN transistor Q4, the switching means SW5 is connected between the base of the NPN transistor Q4 and the ground terminal. As switching means for controlling the switching means SW5, the NPN transistor Q15 serving as the switching means SW7 is connected between the base of the NPN transistor Q13 and the ground terminal. As switching means for controlling the switching means SW6, the NPN transistor Q18 serving as the switching means SW8 is connected between the base of the NPN transistor Q16 and the ground terminal.

The emitter of the NPN transistor Q1 and the collector of the NPN transistor Q3 are connected to each other, the emitter of the NPN transistor Q2 and the collector of the NPN transistor Q4 are connected to each other, and the magnetic head HD is connected by using the connecting point of the NPN transistors Q1 and Q3 and the connecting point of the NPN transistors Q2 and Q4 as first and second output terminals. The switching means SW3 and SW4 make the base potentials of the NPN transistors Q1 and Q2 drop by the reversal of the write signals WD and WDB during the write current passing through the magnetic head HD is reversed and the potential of the first or second output terminal is decreased, thereby widening the voltage difference between both terminals of the magnetic head HD.

According to the first embodiment, the H-shaped bridge circuit is constructed by using the NPN transistors Q1, Q2, Q3, and Q4, the switching means SW1 to SW4 for controlling the base potentials of the NPN transistors Q1 and Q2 are provided, the switching means SW5 to SW8 for controlling the base potentials of the NPN transistors Q3 and Q4 are provided, and the base potential of one of the NPN transistors Q1 and Q2, which is turned off is rapidly dropped by turning on the switching means SW3 or SW4 which constructs high-speed reversing means. Consequently, the potential difference occurring between both terminals of the magnetic head HD can be widened and the direction of the write current passing through the magnetic head HD can be switched at a high speed.

When the switching of the direction of the write current is finished, the base potential of the NPN transistor Q1 or Q2 becomes a low-level voltage and the current for dropping the base potential is not passed, thereby enabling the current consumption to be suppressed more than the conventional technique.

Since one of the switching means SW5 and SW6, which is turned off is rapidly turned off by the switching means SW7 or SW8, one of the third and fourth NPN transistors Q3 and Q4, which is turned on can be rapidly turned on and the reversal of the write current can be accordingly hastened.

Since the NPN transistors Q3 and Q4 are controlled in the active region and the current is not completely interrupted, the write current can be reversed at a high speed.

Since the NPN transistors Q3 and Q4 are constant current transistors, it is unnecessary to separately provide a constant current transistor and the circuit construction can be simplified.

NMOS transistors may be used as the PNP transistors Q5 and Q9 and PMOS transistors may be used as Q6, Q10, Q13, Q15, Q16, and Q18 in the switching means SW1, SW2, SW3, SW4, SW5, SW6, SW7, and SW8.

(Second Embodiment)

Figure 5:
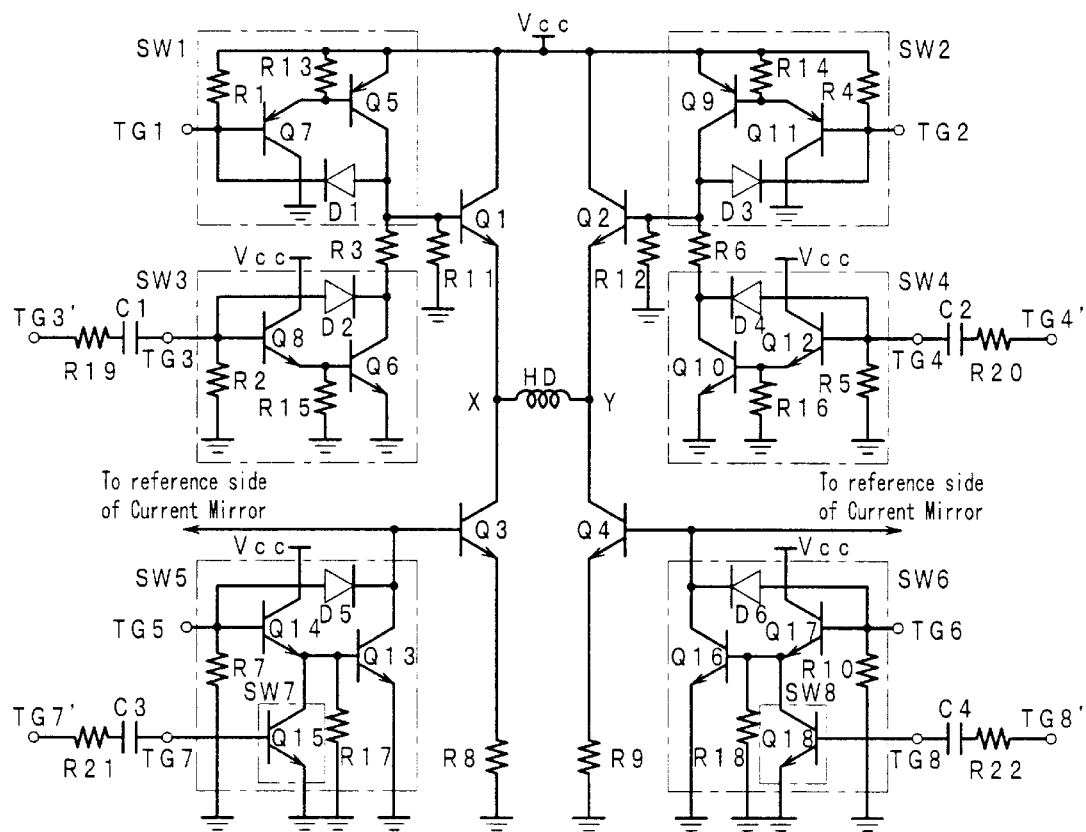
FIG. 5 is a circuit diagram showing a write driver circuit of a second embodiment.

The second embodiment of the invention will be described with reference to FIGS. 5 and 6. Specifically, according to the second embodiment, in the write driver circuit of FIG. 2 of the first embodiment, a differentiating circuit is added at the front stage of each of the input terminals TG3, TG4, TG7, and TG8. A control signal outputted from the selector circuit 1 is differentiated and a resultant signal is applied. With such a construction, a differentiation signal obtained by differentiating the control signal outputted from the selector circuit 1 is supplied to each of the input terminals TG3, TG4, TG7, and TG8. In FIG. 5, each of R19, R20, R21, and R22 denotes a resistor as a component of a differentiating circuit and each of C1, C2, C3, and C4 indicates a capacitor as a component of a differentiating circuit.

TG3' is an input terminal of a differentiating circuit constructed by the resistor R19 and the capacitor C1, TG4' is an input terminal of a differentiating circuit constructed by the resistor R20 and the capacitor C2, TG7' is an input terminal of a differentiating circuit constructed by the resistor R21 and the capacitor C3, and TG8' is an input terminal of a differentiating circuit constructed by the resistor R22 and the capacitor C4. Specifically, the resistor R19 and the capacitor C1 are connected in series between the terminal TG3 and the input terminal TG3', the resistor R20 and the capacitor C2 are connected in series between the terminal TG4 and the input terminal TG4', the resistor R21 and the capacitor C3 are connected in series between the terminal TG7 and the input terminal TG7', and the resistor R22 and the capacitor C4 are connected in series between the terminal TG8 and the input terminal TG8'. The other construction is similar to that of the first embodiment of FIG. 2. The input terminals TG3', TG4', TG7', and TG8' are connected to the selector circuit 1 shown in FIG. 3.

Figure 6:
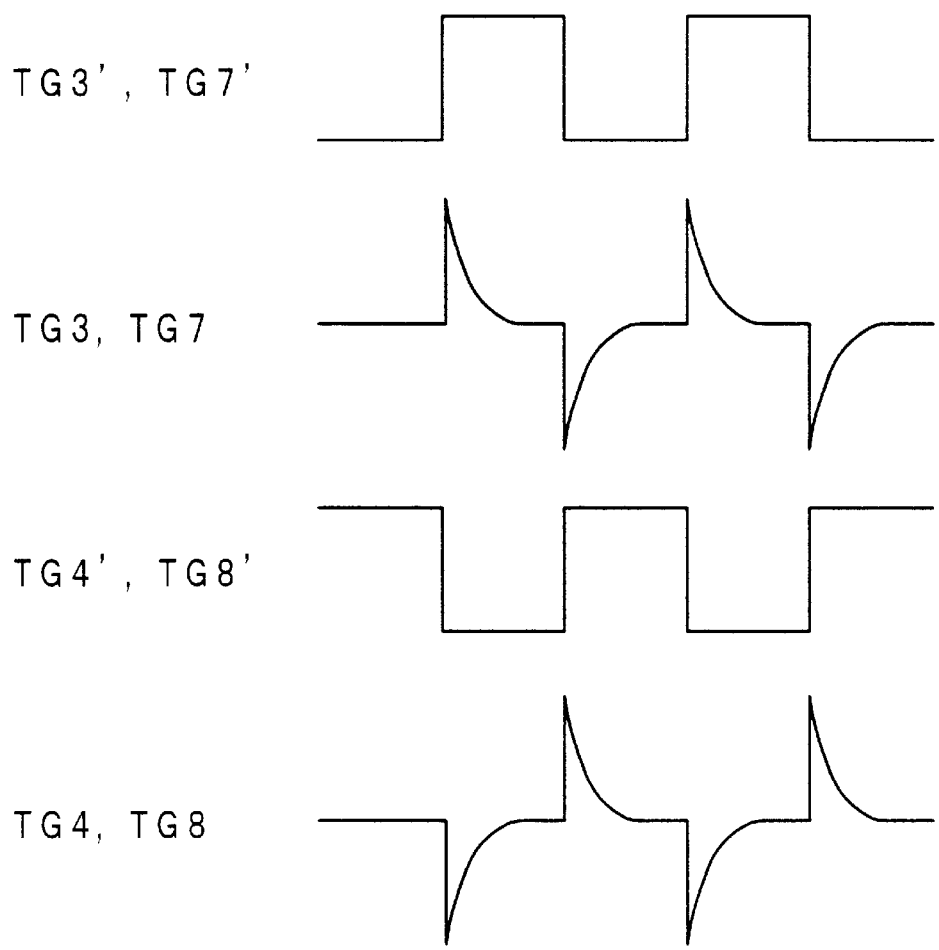
FIG. 6 is a waveform chart showing write signals and control signals of switching means in the second embodiment.

FIG. 6 shows signals supplied to the terminals TG3, TG4, TG7, and TG8 and the input terminals TG3', TG4', TG7', and TG8' in the write driver circuit constructed as mentioned above. Control signals supplied to the terminals TG3' and TG4' have rectangular waves of opposite phases and control signals supplied to the terminals TG7' and TG8' also have rectangular waves of opposite phases. For example, the control signal supplied to the terminal TG3' is converted into a signal of an upward spike shape by the differentiating circuit comprised of the resistor R19 and the capacitor C1 as shown in FIG. 6 when the level is changed from the low level to the high level. The control signal is converted into a downward spike-shaped signal when the level is changed from the high level to the low level and the resultant signal is supplied to the input terminal TG3 of the switching means SW3. Only the upward spike-shaped signal obtained when the level is changed from the low level to the high level turns on the switching means SW3. The above is similarly performed with respect to each of the input terminals TG4, TG7, and TG8.

When the NPN transistor Q1 or Q2 is turned off from the ON state, that is, only when the write current passing through the magnetic head HD is reversed, by turning on the switching means SW3 or SW4, the base potential of the NPN transistor Q1 or Q2 is dropped rapidly. The voltage difference occurring between both terminals of the magnetic head HD can be widened and the write current passing through the magnetic head HD can be changed at a high speed. After changing the write current passing through the magnetic head HD, by turning off the switching means SW3 and SW4, a current is not passed to the switching means SW3 and SW4.

In case of turning on the NPN transistor Q3 or Q4 which is in the OFF state, that is, only when the write current passing through the magnetic head HD is reversed, by turning on the switching means SW7 or SW8, the NPN transistor Q15 or Q18 of the switching means SW5 or SW6 is turned off rapidly. Consequently, by turning on the NPN transistor Q3 or Q4 rapidly, the write current passing through the magnetic head HD can be switched at a high speed. When the switching of the write current passing through the magnetic head HD is finished, by turning off the switching means SW7 and SW8, no current is passed to the switching means SW7 and SW8.

According to the second embodiment, by providing the differential circuit at the input of each of the switching means SW3, SW4, SW7, and SW8, only when the direction of the write current passing through the magnetic head HD is changed, the voltage difference occurring between both terminals of the magnetic head HD is widened, thereby enabling the direction of the write current to be changed at a high speed. When the switching of the direction of the write current is finished, the switching means SW3, SW4, SW7, and SW8 are completely turned off and no current is passed. Thus, the current consumption can be suppressed more than the first embodiment.

Although the differentiating circuits are provided for all of the switching means SW3, SW4, SW7, and SW8 in the above embodiment, by providing the differentiating circuits are provided for either the switching means SW3 and SW4 or the switching means SW7 and SW8, the current consumption can be suppressed to a certain degree.

(Third Embodiment)

The third embodiment of the invention will be described with reference to FIG. 7. The third embodiment is obtained by adding protective resistors and clamp circuits to the write driver circuit of FIG. 2 of the first embodiment.

Figure 7:
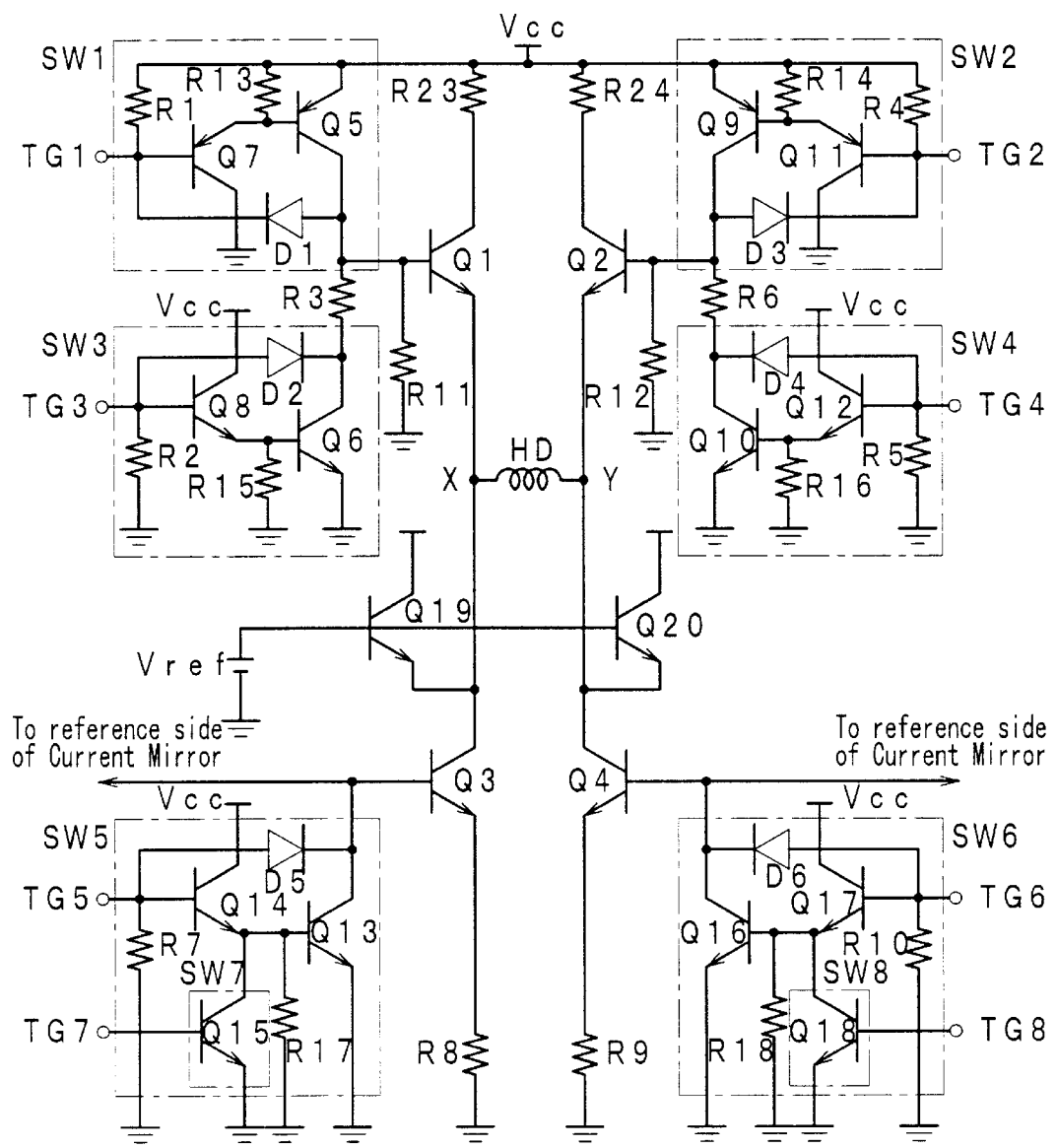
FIG. 7 is a circuit diagram showing a write driver circuit of a third embodiment.

In FIG. 7, R23 and R24 are protective resistors, Q19 and Q20 are NPN transistors as components of a clamp circuit, and Vref denotes a voltage source. The protective resistor R23 is provided between the collector of the NPN transistor Q1 and the power input terminal. The protective resistor R24 is provided between the collector of the NPN transistor Q2 and the power input terminal. The collectors of the NPN transistors Q19 and Q20 are connected to the power input terminals, the bases are connected to the power source Vref, the emitter of the NPN transistor Q19 and the collector (terminal X) of the NPN transistor Q3 are connected to each other, and the emitter of the NPN transistor Q20 and the collector (terminal Y) of the NPN transistor Q4 are connected to each other. The other construction is similar to that of FIG. 2 of the first embodiment.

In the write driver circuit constructed as mentioned above, the NPN transistors Q19 and Q20 form a clamp circuit. When a high-level write signal is supplied to the input terminal WD and a low-level write signal is supplied to the input terminal WDB, that is, when the NPN transistors Q1 and Q4 are ON and the NPN transistors Q2 and Q3 are OFF, the voltage Vx at the terminal X is clamped by the NPN transistor Q19 to a voltage dropped from the voltage of the voltage source Vref only by the base-emitter voltage Vbe of the NPN transistor Q19. On the contrary, a case where the low-level write signal is supplied to the input terminal WD and the high-level write signal is supplied to the input terminal WDB is similar to the above.

The voltage Vy at the terminal Y is clamped by the NPN transistor Q20 to a voltage dropped from the voltage of the voltage source Vref only by the base-emitter voltage Vbe of the NPN transistor Q20.

When the voltage level of the power source Vref is set to a high-level voltage Vbh of the base potential of each of the NPN transistors Q3 and Q4 controlled by the switching means SW5, SW6, SW7, and SW8 and the base-emitter voltage of the NPN transistors Q19 and Q20 is set to Vbe, by setting the voltage of the voltage source Vref as shown by the following expression (9), the NPN transistors Q3 and Q4 can be prevented from being saturated.

$$Vref > Vbh + Vbe \qquad (9)$$

In the third embodiment, in order to prevent the NPN transistors Q3 and Q4 in FIG. 7 from being saturated when the collector voltage becomes lower than the base voltage by a counter electromotive force caused by the inductance of the magnetic head HD, the clamp circuit constructed by the transistors Q19 and Q20 is provided. In order to explain the effects of the clamp circuit, the demerits in the case where the transistors Q3 and Q4 are saturated will be described hereinbelow. When the NPN transistors Q3 and Q4 are saturated, problems such that the control operation by the current mirror cannot be performed and a preset write current is not passed to the collector of the NPN transistor Q3 or Q4 occur. The NPN transistor Q3 or Q4 is saturated when the collector potential becomes smaller than the base potential. Since the case where the collector potential is smaller than the base potential occurs due to the counter electromotive force of the inductance L of the magnetic head HD, the clamp circuit is provided in order to prevent this.

By providing the protective resistor R23 or R24, when a magnetic recording medium comes into contact with the magnetic head HD, the current passing to the collector of the NPN transistor Q1 or Q2 can be regulated. The other construction is similar to the first embodiment.

According to the third embodiment, the voltages Vx and Vy at both terminals X and Y of the magnetic head HD are clamped by the NPN transistors Q19 and Q20, thereby the NPN transistors Q3 and Q4 can be prevented from being saturated. By providing the upper limit of the current passing through the magnetic head HD by the protective resistors R23 and R24, the NPN transistors Q1 and Q2 can be prevented from being broken or deteriorated.

(Fourth Embodiment)

The fourth embodiment of the invention will be described with reference to FIG. 8. The fourth embodiment is obtained by adding a booster (step-up) circuit to the write driver circuit of FIG. 2 of the first embodiment.

Figure 8:
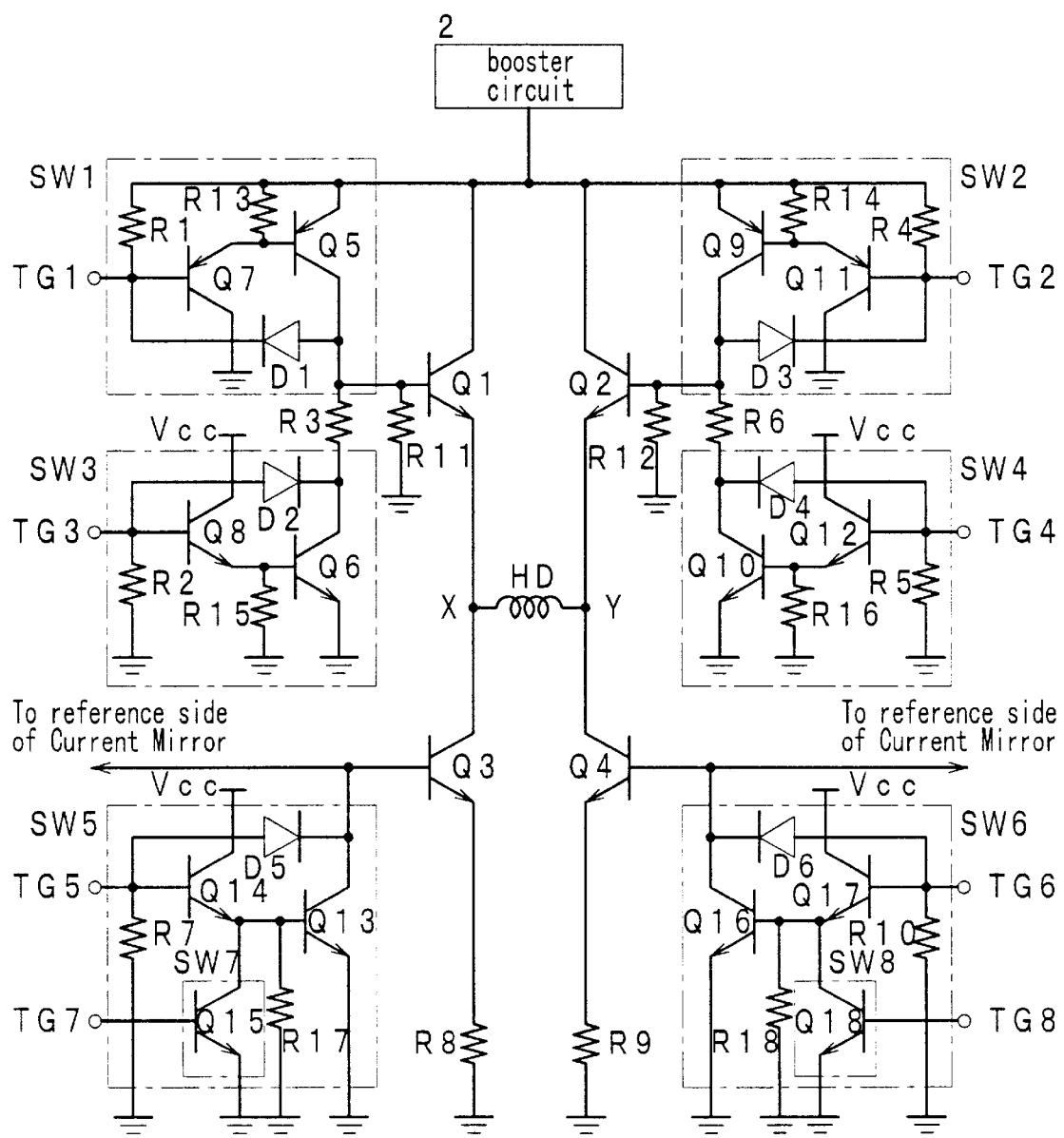
FIG. 8 is a circuit diagram showing a write driver circuit of a fourth embodiment.

In FIG. 8, 2 denotes a booster circuit. In place of the power input terminal, the output terminal of the booster circuit 2 is connected to the resistors R1, R4, R13, and R14, the emitters of the PNP transistors Q5 and Q9, and the collectors of the NPN transistors Q1 and Q2. The other construction is similar to the first embodiment.

In the write driver circuit constructed as mentioned above, by setting the potential of each of the resistors R1, R4, R13, and R14, the emitters of the PNP transistors Q5 and Q9, and the collectors of the NPN transistors Q1 and Q2 to be higher than the power source voltage Vcc, for example, in a period during which the write current passing through the magnetic head HD is reversed from the direction from the terminal X to the terminal Y to the direction from the terminal Y to the terminal X, the base potential Vb2 of the NPN transistor Q2 is higher as compared with that of the first embodiment. The voltage at the terminal Y of the magnetic head HD can be set high, the base potential Vb1 of the NPN transistor Q1 is dropped to the voltage level same as that of the first embodiment, and the potential at the terminal X of the magnetic head HD can be decreased to the voltage level same as that of the first embodiment. The voltage difference occurring between both terminals of the magnetic head HD can be therefore wider than that of the first embodiment. With respect to the period as well, during which the write current passing through the magnetic head HD is reversed from the direction from the terminal Y to the terminal X to the direction from the terminal X to the terminal Y, the base potential Vb1 of the NPN transistor Q1 is higher as compared with that of the first embodiment. In a manner similar to the above, the voltage difference occurring between both terminals of the magnetic head HD can be wider than that of the first embodiment. The other construction is similar to the first embodiment.

According to the fourth embodiment, by setting the voltage applied to each of the resistors R1, R4, R13, and R14, the emitters of the PNP transistors Q5 and Q9, and the collectors of the NPN transistors Q1 and Q2 to be higher than the power source voltage, the write current passing through the magnetic head HD can be reversed at a higher speed as compared with the first embodiment. Also with the construction in which only the switching means SW3 and SW4 are connected to the booster circuit 2 and the collectors of the NPN transistors Q1 and Q2 are connected to the power input terminal, the booster function is obtained. As compared with the case of using no booster circuit 2, the voltage difference between both terminals X and Y of the magnetic head HD can be made wider and the direction of the write current passing through the magnetic head HD can be switched at a higher speed. In this case, under the condition that the power voltage is increased to a degree at which the base potential of each of the NPN transistors Q1 and Q2 determined by the switching means SW3 and SW4 does not become higher than the power voltage (so as not to saturate the NPN transistors Q1 and Q2), the effects of boost can be obtained.

In the case where the npn transistors Q1 and Q2 are connected to the booster circuit 2 as mentioned above, there is no such regulation.

What is claimed is:

1. A write driver circuit comprising: a reversal switching circuit having a pair of output terminals connected to both terminals of a magnetic head, for reversing the direction of a write current passing through the magnetic head in response to reversal of a write signal, and reversing means for reversing the write current by making a voltage difference between both terminals of the magnetic head in a period from reversal of the write signal to reversal of the write current to the magnetic head larger than a voltage difference between both terminals of the magnetic head, which occurs only in the reversal switching circuit, characterized in that the reversal switching circuit comprises: a first power source side transistor and a first ground side transistor which are connected in series in the forward direction between a power input terminal and a ground terminal; a second power source side transistor and a second ground side transistor which are connected in series in the forward direction between the power input terminal and the ground terminal; first switching means which is connected to the base of the first power source side transistor in response to a write signal; second switching means which is connected to the base of the second power source side transistor and controls the second power source side transistor in response to the write signal; third switching means which is connected to the base of the first ground side transistor and controls the first ground side transistor in response to the write signal; and fourth switching means which is connected to the base of the second ground side transistor and controls the second ground side transistor in response to the write signal, the magnetic head is connected between a connecting point of the first power source side transistor and the first ground side transistor and a connecting point of the second power source side transistor and the second ground side transistor, and the operation of a set of the first and fourth switching means and that of a set of the second and third switching means are reversed in response to reversal of the write signal to reverse the operation of a set of the first power source side transistor and the second ground side transistor and that of a set of the second power source side transistor and the first ground side transistor, thereby reversing the write current passing through the magnetic head.

2. The write driver circuit according to claim 1, characterized in that each of the first and second power source side transistors and the first and second ground side transistors is an NPN transistor, the first switching means is connected between a power input terminal and the base of the first power source side transistor, the second switching means is connected between the power input terminal and the base of the second power source side transistor, the third switching means is connected between the base of the first ground side transistor and the ground terminal, and the fourth switch is connected between the base of the second ground side transistor and the ground terminal.

3. The write driver circuit according to claim 2, characterized in that the third switching means has a first NPN switch transistor whose collector is connected to the base of the first ground side transistor and whose emitter is connected to the ground terminal, the fourth switching means has a second NPN switch transistor whose collector is connected to the base of the second ground side transistor and whose emitter is connected to the ground terminal, seventh switching means for rapidly decreasing the base potential of the first NPN switch transistor is provided between the base of the first NPN switch transistor and the ground terminal, and eighth switching means for rapidly decreasing the base potential of the second NPN switch transistor is provided between the base of the second NPN switch transistor and the ground terminal.

4. The write driver circuit according to claim 1, characterized in that the reversal switching circuit comprises: a first power source side transistor and a first ground side transistor which are connected in series in the forward direction between a power input terminal and a ground terminal; a second power source side transistor and a second ground side transistor which are connected in series in the forward direction between the power input terminal and the ground terminal; first switching means which is connected to the base of the first power source side transistor and controls the first power source side transistor in response to a write signal; second switching means which is connected to the base of the second power source side transistor and controls the second power source side transistor in response to the write signal; third switching means which is connected to the base of the first ground side transistor and controls the first ground side transistor in response to the write signal; and fourth switching means which is connected to the base of the second ground side transistor and controls the second ground side transistor in response to the write signal, wherein the magnetic head is connected between a connecting point of the first power source side transistor and the first ground side transistor and a connecting point of the second power source side transistor and the second ground side transistor, and the operation of a set of the first power source side transistor and the second ground side transistor and that of a set of the second power source side transistor and the first ground side transistor are reversed by reversing the operation of a set of the first and fourth switching means and that of a set of the second and third switching means in response to reversal of the write signal, thereby reversing the write current passing through the magnetic head, said reversing means comprises fifth and sixth switching means connected to the bases of the first and second power source side transistors, the base potential of one of the first and second power source side transistors, which is turned off by the reversal of the write signal is selectively decreased to about the ground potential and the potential at the connecting point of one of the power source side transistors, which is turned off by the reversal of the write signal and the ground side transistor which is serially connected to the power source side transistor is decreased, thereby widening the voltage difference between both terminals of the magnetic head.

5. The write driver circuit according to claim 4, characterized in that each of the first and second power source side transistors and the first and second ground side transistors is an NPN transistor, the first switching means is connected between a power input terminal and the base of the first power source side transistor, the second switching means is connected between the power input terminal and the base of the second power source side transistor, the third switching means is connected between the base of the first ground side transistor and the ground terminal, the fourth switch is connected between the base of the second ground side transistor and the ground terminal, the fifth switching means is connected between the base os the first power source side transistor and the ground terminal, and the sixth switching means is connected between the base of the second power source side transistor and the ground terminal.

6. The write driver circuit according to claim 5, characterized in that the third switching means has a first NPN switch transistor whose collector is connected to the base of the first ground side transistor and whose emitter is connected to the ground terminal; the fourth switching means has a second NPN switch transistor whose collector is connected to the base of the second ground side transistor and whose emitter is connected to the ground terminal; seventh switching means for rapidly decreasing the base potential of the first NPN switch transistor is provided between the base of the first NPN switch transistor and the ground terminal; and eighth switching means for rapidly decreasing the base potential of the second NPN switch transistor is provided between the base of the second NPN switch transistor and the ground terminal.

7. The write driver circuit according to claim 1, 2, 3, 4, 5 or 6, characterized in that the third and fourth switching means control the first and second ground side transistors within active regions, respectively.

8. The write driver circuit according to claim 1, 2, 3, 4, 5 or 6, characterized in that each of the first and second ground side transistors is an output side transistor of a current mirror circuit.

9. The write driver circuit according to claim 4 or 5, characterized in that first and second differentiating circuits for differentiating a write signal are provided at input terminals of the fifth and sixth switching means.

10. The write driver circuit according to claim 3 or 6, characterized in that third and fourth differentiating circuits for differentiating a write signal are provided at input terminals of the seventh and eighth switching means.

11. The write driver circuit according to claim 1 or 4, characterized in that first and second clamp circuits for preventing the first and second ground side transistors from being saturated are provided at the connecting point of the first power source side transistor and the first ground side transistor and the connecting point of the second power source side transistor and the second ground side transistor, respectively.

12. The write driver circuit according to claim 1 or 4, characterized in that first and second protective resistors for regulating a current passing to the first and second power source side transistors are provided between the first and second power source side transistors and the power input terminal, respectively.

13. The write driver circuit according to claim 2 or 5, characterized in that a booster circuit for widening a voltage difference between both terminals of the magnetic head is provided between the first and second switching means and the power input terminal.

14. The write driver circuit according to claim 2 or 5, characterized in that a booster circuit for widening a voltage difference between both terminals of the magnetic head is provided between the first and second switching means and the first and second power source side transistors and the power input terminal.

* * * * *